June 24, 1958 P. HEFTLER 2,840,385
SHOCK-ABSORBING SPRING SUSPENSIONS AND STEERING LINKAGE
Filed April 27, 1951

INVENTOR:
Paul Heftler

United States Patent Office 2,840,385
Patented June 24, 1958

2,840,385

SHOCK-ABSORBING SPRING SUSPENSIONS AND STEERING LINKAGE

Paul Heftler, Grosse Pointe Park, Mich., assignor to Victor Heron, Riverside, Ontario, Canada, as trustee Application April 27, 1951, Serial No. 223,345

10 Claims. (Cl. 280—93)

This invention relates to independent spring suspensions for automobiles and particularly to suspensions for the front or steerable wheels of automobiles. The standard type of independent front suspension is designed to absorb blows and shocks that are received by the wheel from the road and that act vertically. However, experiments have shown that bumps and holes in a road tend to knock a wheel back and to one side or the other as well as up. The standard type of independent suspension, apart from the tire, absorbs little or none of longitudinal and transverse components of the shocks given to the wheel by the road, and much of such shocks are therefore transmitted by the suspension to the frame of the car and to the passengers. The big shocks are belt as jolts, and the little shocks are felt as vibration and heard as noise or rumble.

This invention provides means for absorbing both the longitudinal and transverse components of shocks, as well as the vertical, and it therefore makes the car on which it is used more comfortable and quieter. The invention, in brief, consists in making the pivots between the suspension links and the frame movable relative to the frame, instead of having them fixed to the frame, and in providing springs for holding the pivots in position and permitting them to move in response to shocks. These springs may be of metal or rubber, but rubber is preferred because the rubber can be arranged to act as both spring and guide so as to make lubrication unnecessary.

One refinement of the invention is the arrangement of the steering linkage, with one of its main pivots on the same movable bracket that carries some of the pivots of the links, so that fore-and-aft or side-to-side movement of the wheels has no effect on the direction in which they are held by the steering linkage.

While the invention can be applied to many different types of independent suspensions, it can be applied best to the type of suspension shown in U. S. Patent No 2,334,702 and used on the British "Rover" automobile. Such an application is therefore shown in the drawing, in which.

Figures 1, 2, 3:
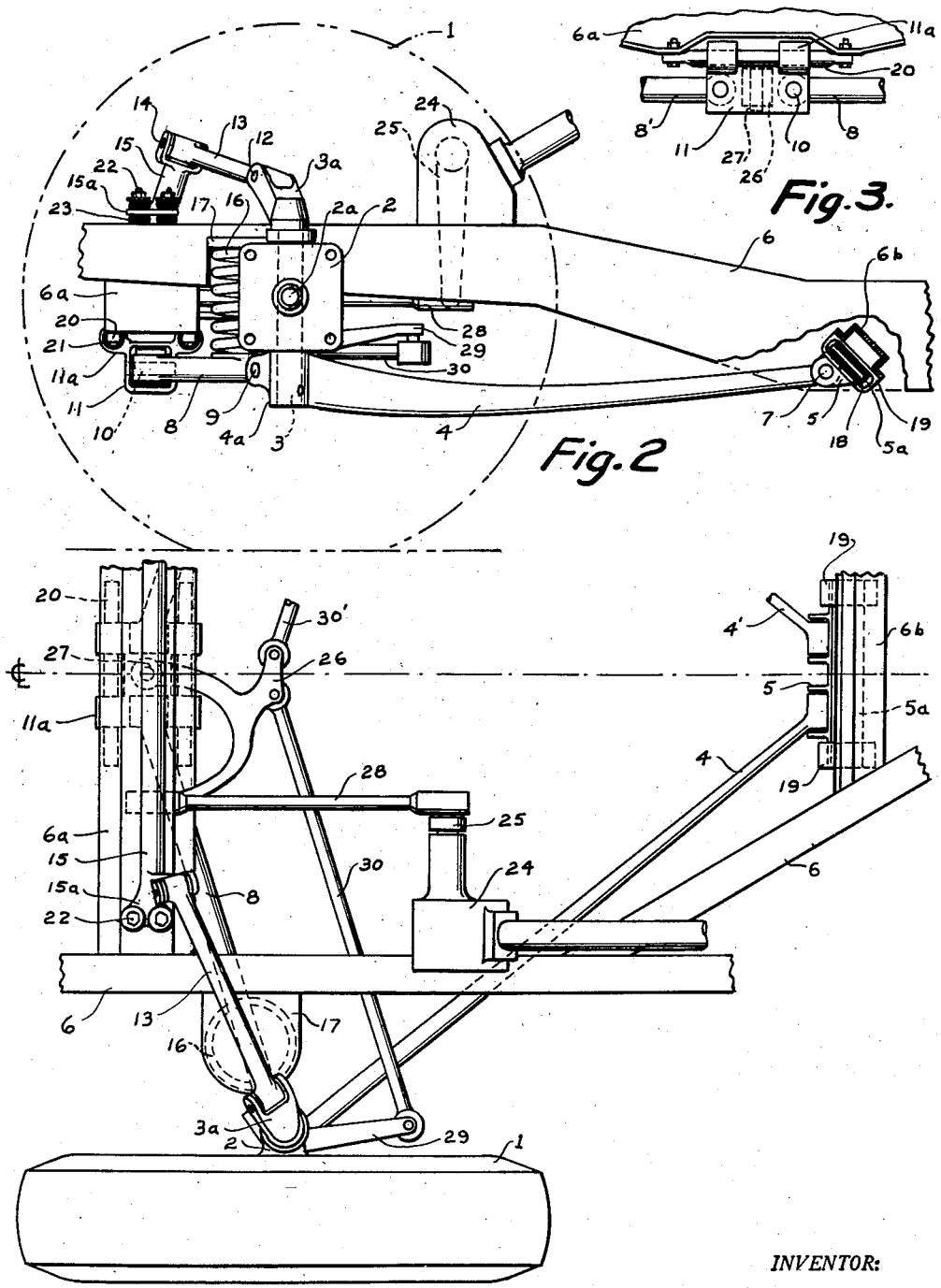
Fig. 1 is a side view of the front end of the chassis, with the wheel and brake mechanism removed and a part of the frame broken away to more clearly show the suspension.
Fig. 2 is a plan view of one side of the front end of the chassis.
Fig. 3 is a front view of the front lower center part of the chassis.

In this form of the invention, the wheel 1 is mounted on the spindle 2a of a steering knuckle and brake support 2 which swivels on an upright king-pin 3. The lower end of the king-pin is firmly fixed and pinned in a socket 4a on the forward end of a torque arm 4, which extends back and in towards the center of the vehicle. The rear or inner end of the torque arm is connected to a bracket 5 on the frame 6 by either a ball-and-socket joint or a rubber-bushed cylindrical pivot 7 having its axis extending across the vehicle.

The forward or outer end of the torque arm 4 is connected to the front across-member 6a of the frame by a long link 8 that extends between a pivot 9 on the torque arm and a pivot 10 in a bracket 11 on the bottom of the frame cross-member. Both of these pivots are of the rubber-bushed cylindrical type, and they are placed so that their axes pass through the center of the rear pivot 7.

The upper end of the king-pin 3 is formed into a fork 3a which holds the pivot 12 on the outer end of a link 13. The other end of this upper link is connected by a pivot 14 to a bracket 15 on the front frame cross-member 6a. Both of these pivots 12 and 14 are of the rubber-bushed cylindrical type, and their axes also pass through the center of the rear pivot 7. With this arrangement of the pivots 9, 10, 12 and 14 of the links so that their axes all pass through the center of the torque arm pivot 7, the linkage is a true pyramidal linkage, and there is no tendency for the link pivots to bind. The torque arm pivot 7, theoretically, should be a ball-and-socket joint, but the motion in this pivot is mainly about one axis and can be taken care of by a cylindrical rubber joint.

The weight of the vehicle is transferred to the wheel through a coil spring 16, which acts between a bracket 17 on the frame and the lower link 8.

What has been described thus far is the front suspension on one side of the vehicle. The suspension on the other side is identical, except that one side is left-handed while the other is right-handed, and the same brackets 5, 11 and 15 serve for both sides. The rear bracket 5 has both torque arms 4 and 4' pivoted to it, the lower bracket 11 has both lower links 8 and 8' pivoted to it, and the upper bracket 15 has both upper links 13 pivoted to it, although only one appears in the drawing. Each of the three brackets is arranged so that it can move a little on the frame and thus absorb shocks coming to it through the linkage.

The rear bracket 5, to which the torque arms are pivoted, includes a flat base 5a that lies in a plane extending across the vehicle and sloping down and back at a considerable angle to the horizontal. Each end of the base 5a forms the middle member of a double rubber sandwich 18, whose outer shell 19 is fixed to the frame cross-member 6b. The rubber sandwiches 18 act as guides and permit the bracket 5 to move in any direction in the plane of its base 5a, and they also act as springs to resiliently resist such movement and to return the bracket to its normal position after any such movement.

If the only function of the rubber sandwiches 18 at the rear ends of the torque arms were to absorb shocks, the base 5a of the bracket and the rubber sandwiches would be put horizontally, but they must also transmit to the frame most of the braking force from the front wheels. This force acts up and back in a plane passing through the spots where the front wheels touch the ground and through the joints 7 at the rear ends of the torque arms. The shocks which are transmited by the torque arms to the joints 7 act in a different plane than the braking force; they act chiefly in a plane passing through the wheel spindles 2a and sloping down to the joints 7. Hence, by putting the rubber sandwiches 18 at a considerable angle to the horizontal, they will be at a great angle to the direction of the braking forces but at a small angle to the direction of the shock forces, and they will yield very little under the braking forces but yield considerably under shock forces.

This selective yielding of the rubber sandwiches 18 at the rear ends of the torque arms, yielding more under shock loads than under brake loads, can be explained also by the theory of least energy. When the rubber sandwiches 18 yield and let the steering knuckle and brake support 2 move back a litle, the pivot 7 of the torque arm moves down as well as back. This rocks the stering knuckle and brake support 2 back as it moves back bodily, and this turns the brake backing plate (that is bolted to the brake support 2 by the four holes shown) a litle in the direction opposite to that in which the wheel is turning. Hence, this rocking of the steering knuckle and brake support 2 is against the torque reaction of the brake and absorbs energy, and there is therefore less energy available to cause deformation of the rubber sandwiches.

The lower bracket 11, to which the lower links 8 are pivoted, has the shape of an open-ended box with four cylindrical ears 11a at its four top corners. The axes of the cylindrical ears extend across the vehicle, and through them pass two round rods 20. The ends of these rods are flattened and are bolted to the flanges of the front frame cross member 6a, as shown in Fig. 3. There is considerable space around the rods 20 within the cylindrical ears of the bracket 11, and this space is filled with rubber bonded to the rods and to the inside of the ears. This rubber 21 serves both to guide the bracket relative to the rods and to resiliently hold the bracket in its central position and to return it there after it has been moved to one side or the other by shocks.

The upper bracket 15 extends across the frame and has a foot 15a at each end that is attached to the frame by two bolts 22 and four rubber pads or washers 23. There is considerable clearance in the holes in the feet 15a through which the bolts 22 pass so that the bracket 15 can move sideways a little without there being any metal-to-metal contact. The rubber washers 23 are under considerable initial compression caused by tightening the bolts 22 and do not yield much more under compression, but they can yield sideways in shear. Thus they permit the bracket 15 to move sideways a little under shocks and act as springs to return it to its normal position.

The steering linkage consists of the conventional steering gear 24 mounted on the frame and having a pitman arm 25 that swings fore and aft, a centrally located steering lever 26 carried by a pivot 27 on the lower bracket 11, a drag link 28 connecting the pitman arm to the steering lever, steering knuckle arms 29 fixed to the steering knuckles, and tie rods 30 and 30' connecting the central arm of the steering lever to the steering knuckle arms. These parts are arranged in such a way that the direction of the wheels controlled by the steering linkage is not affected by their movement under shocks, even though the suspension is such that such movements can occur in many different directions instead of only vertically as in ordinary suspensions.

The tie rod 30 is parallel to the lower link 8 and practically in the same horizontal plane and practically of the same length. Therefore, when the wheel moves up-and-down or fore-and-aft or tilts, its direction will not change.

The fulcrum or pivot 27 for the central steering lever 26 is carried by the same lower bracket 11 to which the lower link 8 is pivoted. Therefore, when the wheel moves sideways, the central steering lever moves sideways with it and does not change the direction of the wheel. Nor is the angle of the central steering lever affected when the wheel and consequently the link 8 and the lower bracket 11 and the fulcrum 27 of the central steering lever moves sideways, for the drag link 28 extends fore-and-aft in a plane perpendicular to the direction of this sideways movement. To permit this arrangement, the drag-link end of the central steering lever 26 curves up and forward, and both it and the end of the drag link project into a large clearance hole in the front frame cross-member 6a.

There are several important refinements in the form of the invention illustrated. The pivots 7 for the torque arms are practically on the center-line CL of the car.

With this arrangement, there is practically no change in the caster of the wheels and no resulting tendency to "under-steer" when the car rolls or rocks sideways on a turn that is not banked for the speed at which it is being taken.

The torque arm 4 is hollow and oval in cross-section, and it lies in the same plane as the king-pin 3; thus there are never any substantial forces tending to bend it sideways. However, practically the same results can be had with a separate king-pin and king-pin carrier to which the upper and lower links and the torque arm are connected (as in the above-mentioned patent No. 2,334,702) if the torque arm is tipped sideways so that the plane in which it lies passes through the spot where the axis of the king-pin intersects the ground or a spot on the axis a few inches above the ground.

The axes of both the upper and lower links 13 and 8 intersect the axis of the king-pin. Thus no forces acting between the wheel and the links can cause sideways bending forces to act on the torque arm.

The two ends of each link 8 or 13 are at the same distance from the torque arm pivot 7, which is the apex of the pyramidal linkage. Thus the upper and lower links are the bases of equilateral triangles in the linkage, and the angles between the axes of the pivots and the axes of the links are equal and their deviations from right angles are as small as possible with the given angles at the apex of the linkage. This makes the axial component of the forces at the pivots as small as possible and makes it practical to use rubber-bushed pivots of types which are not especially able to carry such axial forces.

The spring 16 is placed as far outboard as practical so as to reduce the bending moment in the lower link to a minimum. An alternate arrangement would be to put the spring inboard a little and put the rubber bumper, which acts as a stop to upward movement of the wheel, outboard of the spring so that it hits the lower link as close as possible to its outer pivot 9. This idea may be carried even further by providing a shelf on the inner side of the torque-arm-and-king-pin assembly for the bumper to hit so that the action of the bumper causes no bending forces at all in the lower link.

There are a number of modifications of the invention which might be made, depending on what balance one wants to strike between good results and cost. The pivots for the two torque arms might be mounted on two separate brackets, each independently connected to the frame by rubber springs, instead of on one single bracket. The inner pivots 10 and 14 of both the upper and lower links might all be mounted on one large U-shaped bracket lying in a vertical transverse plane and able to move sideways fairly freely under the restraining influence of springs but not able to move appreciably up-and-down or fore-and-aft, instead of being mounted on two separate brackets, and this one large bracket would, of course, carry the pivot of the center steering lever. The inner pivots of the upper links might be mounted on two small brackets, each spring mounted on the frame, instead of on one large bracket extending across the frame as shown. To simplify things a little more, the spring mounting of the inner pivots for the upper links might be omitted entirely, these pivots being carried on rigid brackets fixed to the frame. In the latter case, some shock absorbing ability could be provided in the upper links themselves by making each of them of two tubular parts telescoped one inside the other with considerable space between their walls occupied by rubber bonded to them and acting as a shear spring to let the link resiliently change in length. A similar construction could be used at the rear ends of the torque arms instead of mounting the torque arm pivots on a spring-held bracket.

The invention may be modified for use with the rear or non-steerable wheels of a vehicle in either of two ways.

The simpler way is to merely omit the steering linkage and to fix the stub-axle housing or the stub-axle to the end of the torque arm. The more elaborate way is to substitute two vertically-spaced rubber joints for the king-pin so that the stub-axle housing or the stub axle can still swing a little relative to the torque arm and to transform the steering tie-rod into a third transverse link with the axes of the pivots at its ends passing through the joint at the frame end of the torque arm. There will then be three links extending transversley out to the sub-axle housing or carrier, and all three links on both sides can be pivoted to one large bracket mounted on the frame so that it can move resiliently sideways. This bracket can also carry the final drive and differential.

This last modification of the invention for use with non-steerable wheels suggest a further modification of the invention when used with the front or steerable wheels of a vehicle having its engine in the conventional position, in front. In this further modification, a single large bracket to which the inner ends of all four links are pivoted is used, this bracket is mounted on rubber springs so as to be able to move sideways on the frame, and the forward end of the engine is carried on this bracket instead of directly on the frame. With this arrangement, the inertia of the engine will help to absorb the lateral shocks before any part of them is transmited to the frame. To carry this idea out still further, the mounting of the front end of the engine on the forward bracket can be through a connection which allows the engine to move fore-and-aft a little relative to the bracket while preventing sidewards movement between them, and then the rear of the engine and transmission assembly can be carried by the bracket to which the ends of the torque arms are pivoted instead of being carried directly by the frame. Then the inertia of the engine will help to absorb the longitudinal shocks also before any part of them is transmitted to the frame. Furthermore, the same mountings that insulate the suspension pivots from the frame will help to insulate the engine from the frame too.

The general principles of the invention may also be applied to the conventional double-wishbone type of independent suspension, although the resulting structure is not as simple as with the pyramidal suspension shown in the drawing. Perhaps the best way of doing this is to mount the eight pivots on the inner ends of the four wishbones on a single large bracket and then to connect this bracket to the frame by three or four rubber sandwiches each arranged to lie on the surface of an imaginary cylinder whose axis lies on the ground and extends between the wheels. In plan, the rubber sandwiches should be arranged at the corners of a triangle or a diamond, with two of them out at the sides and the other one or two on the center-line of the vehicle. With this arrangement of the rubber sandwiches, ordinary braking forces will not tend to move the suspension, but it will move in response to shock forces. The steering gear should also be mounted on the bracket that carries the wishbone pivots and be connected to the steering wheel through universal and slip joints. However, if means are provided for preventing the suspension bracket described from moving sideways, a conventional steering linkage mounted on the frame can be used, and the construction is simplified, although it can no longer absorb much of sideways shocks.

Although I have shown and described in detail only one form of the invention and have outlined some others, the invention may be carried out in other ways, some of which may even involve further invention. It therefore includes not only what has been described but also any construction that falls within the terms of any of the following definitions or claims.

I claim:

1. In a vehicle, a frame, a king-pin, a steering knuckle on the king-pin, a wheel on the steering knuckle, a steering arm fixed to the steering knuckle, a bracket resiliently movable on the frame, a link connecting the king-pin to the bracket, a steering arm pivoted on the bracket, and a tie-rod connecting the two steering arms.

2. A linkage as defined in claim 1 and in which the tie-rod is practically parallel to the link.

3. A linkage as defined in claim 1 and in which the tie-rod lies in practically the same horizontal plane as the link.

4. In a vehicle, a frame, a king-pin, a steering knuckle on the king-pin, a wheel on the steering knuckle, a steering arm fixed to the steering knuckle, a bracket resiliently movable sideways on the frame but not movable fore-and-aft, a link connecting the king-pin to the bracket, a steering lever pivoted on the bracket, a tie-rod connecting the steering lever to the steering arm, a steering gear fixed to the frame, and a drag link extending in a vertical fore-and-aft plane and connecting the steering gear to the steering lever.

5. A linkage as defined in claim 4 and in which the connection between the drag link and the steering lever lies in the same vertical transverse plane as the pivot of the steering lever on the bracket.

6. In a vehicle, a frame, a wheel, a bracket spaced from the axis of the wheel towards the center of the vehicle, means for guiding the bracket relative to the frame in a plane that slopes up over the axis of the wheel and for resiliently permitting the bracket to move in that plane, and a torque arm connected to the wheel and pivoted to the bracket.

7. In a vehicle, a frame, a bracket resiliently movable sideways on the frame, two wheels one on each side of the vehicle, and linkages connecting both wheels to the one bracket.

8. In a vehicle, a frame, a wheel spindle and a brake support movable fore and aft, and means for rocking the brake support about the axis of the wheel spindle as they move fore and aft.

9. In a vehicle, a frame, a wheel spindle and a brake support movable fore and aft from an initial position relative to the frame, means for resisting the movement of the wheel spindle and the brake support from their initial positions and applying a force to return them to their initial positions, and means for rocking the brake support about the axis of the wheel spindle as they move fore and aft.

10. In a vehicle, a frame, a wheel spindle and a brake support movable fore and aft from a normal position relative to the frame, spring means for resiliently holding the wheel spindle and the brake support in their normal position, and means for rocking the brake support about the axis of the wheel spindle towards the center of the vehicle as they move towards the center of the vehicle and for rocking it away from the center of the vehicle as they move away from the center of the vehicle.

References Cited in the file of this patent

UNITED STATES PATENTS

| | | |
|---|---|---|
| 2,153,233 | Best | Apr. 4, 1939 |
| 2,153,498 | Broulhiet | Apr. 4, 1939 |
| 2,164,470 | Opolo | July 4, 1939 |
| 2,246,833 | Beemer | June 24, 1941 |
| 2,334,702 | Newton et al. | Nov. 23, 1943 |